F. REINHARDT.
Comb.

No. 214,194. Patented April 8, 1879.

Witnesses
Otto Aufeland
William Miller

Inventor
Frederick Reinhardt
by
Van Santvoord & Hauff
his attys.

UNITED STATES PATENT OFFICE.

FREDERICK REINHARDT, OF NEW YORK, N. Y.

IMPROVEMENT IN COMBS.

Specification forming part of Letters Patent No. 214,194, dated April 8, 1879; application filed January 29, 1879.

*To all whom it may concern:*

Be it known that I, FREDERICK REINHARDT, of the city, county, and State of New York, have invented a new and useful Improvement in Combs, which improvement is fully set forth in the following specification, reference being had to the accompanying drawings, in which—

Figure 2:
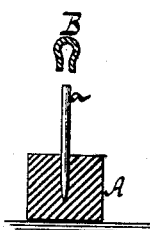
Figure 1:
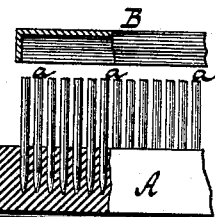
Figure 3:
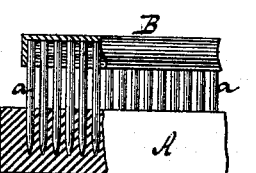
Figure 4:
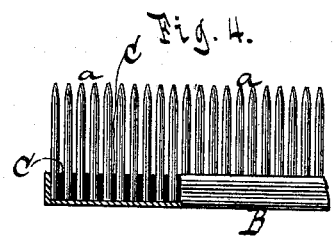
Figure 5:

Figure 1 is a side view, partly in section, of the handle of the comb and the die, with the teeth driven into the die. Fig. 2 is a transverse vertical section of the same. Fig. 3 shows the handle or back placed on the teeth. Figs. 4 and 5 show the teeth fastened in the handle or back.

Similar letters indicate corresponding parts.

This invention relates to that class of combs which are made of metal; and consists in first driving a series of separate teeth into a suitable die prepared for their reception, in order to round off said teeth, and then placing the back on said series of teeth, and fastening the teeth, as they stand in the die, in said back by means of solder or any other suitable soft metal.

The disadvantage of combs with metal teeth as at present manufactured is, that the teeth are not perfectly round, but are slightly nicked or are angular. The result is, that such combs do not pass smoothly through the hair, often catching it and pulling it out, and on this account such combs are not easily sold.

In order to overcome this difficulty I have provided the following method: I provide a suitable die, A, which is provided with a series of holes. In the drawings that end of said die A is shown which is intended to receive the coarse teeth of the comb. The other half of the die may be prepared for the fine teeth. These holes in the die A are perfectly round, and when the teeth *a a* of the comb are driven or forced into these holes, as shown in Figs. 1 and 2, the ends of these teeth adapt themselves to the forms of the holes. Of course I do not limit myself to round holes, as any other shape may be given to these holes, as may be desired.

A great advantage of my process lies in the fact that I obviate sawing or cutting connected teeth in a strip, am enabled to use ordinary commercial drawn wire, and especially that the same act by which the teeth are pointed secures them in properly-spaced rows and position for receiving the back.

After the teeth *a a* have been driven into their places in the die A the back B is placed on the teeth, as shown in Fig. 3.

The back, teeth, and die are then reversed, so that the back B occupies the lowest position, as shown in Fig. 4. In this position solder or any other suitable soft metal, C, is poured into the back, as shown in Figs. 4 and 5, which fixes the teeth firmly in place in the back. The die A is then removed and the comb is ready for the market. The back B of said comb is stamped up out of sheet metal in the form shown in the drawings, or in any other suitable form.

What I claim as new, and desire to secure by Letters Patent, is—

The method of making combs which consists in first shaping the teeth by drawing or pressing them into a suitable die, A, and then fastening said teeth, as they stand, in the handle or back B by means of solder or other soft metal, and removing the die, substantially in the manner and for the purpose set forth.

In testimony that I claim the foregoing I have hereunto set my hand and seal this 27th day of January, 1879.

FREDERICK REINHARDT. [L. S.]

Witnesses:
 CHRISTIAN EHRLINGER,
 W. HAUFF.